Figure 4:
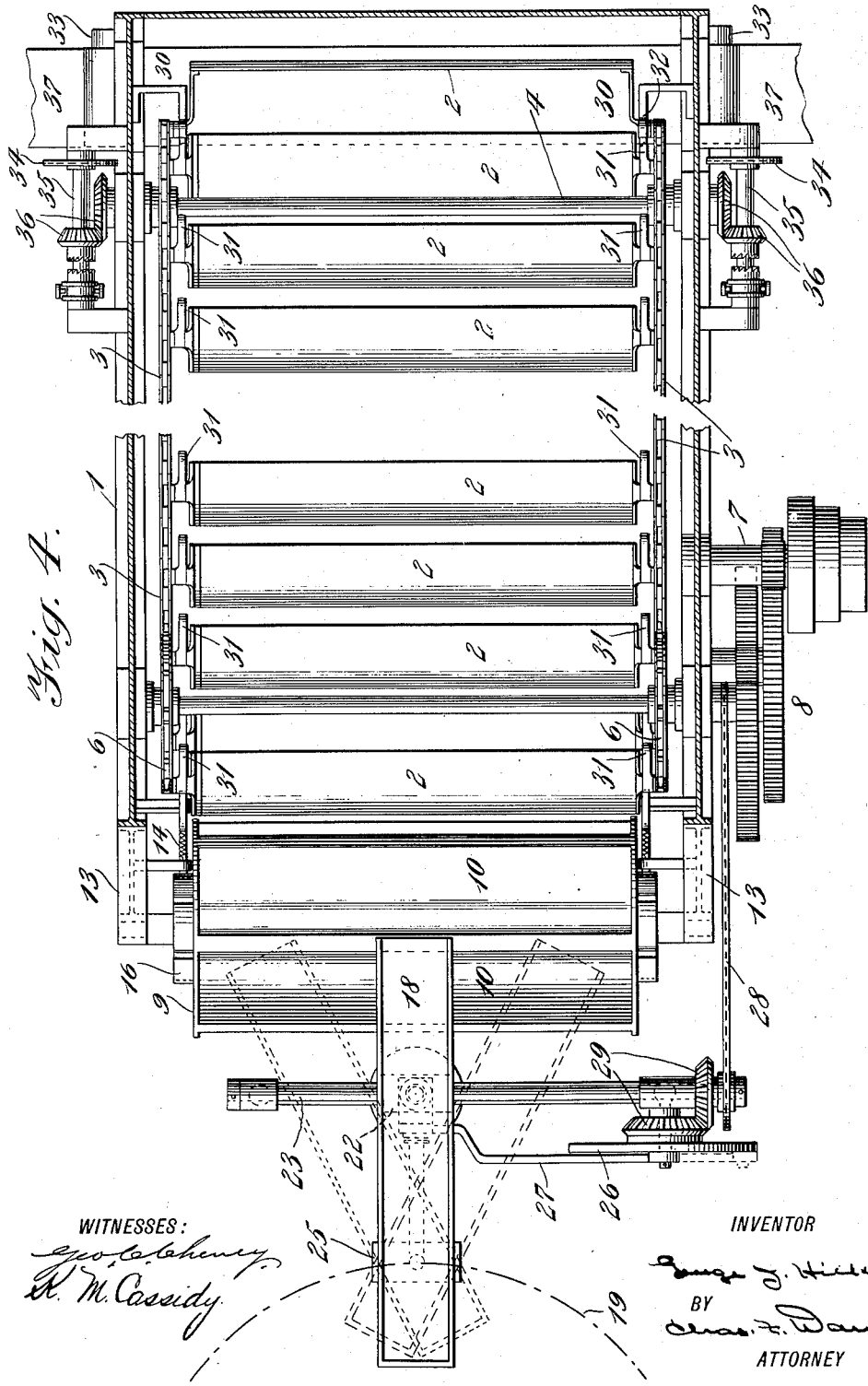

G. J. HICKS.
PROOFING MACHINE.
APPLICATION FILED NOV. 12, 1909.
1,025,914.
Patented May 7, 1912.
3 SHEETS—SHEET 1.
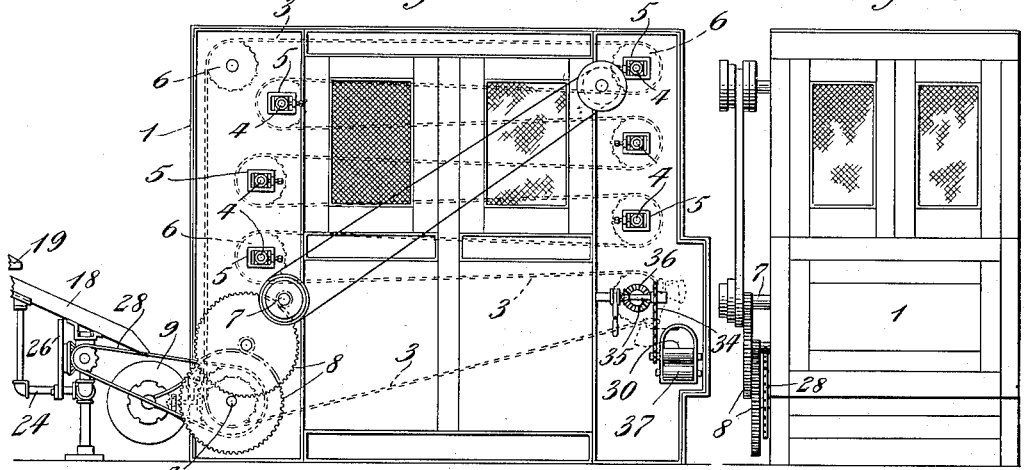
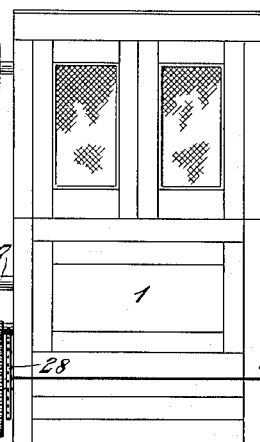
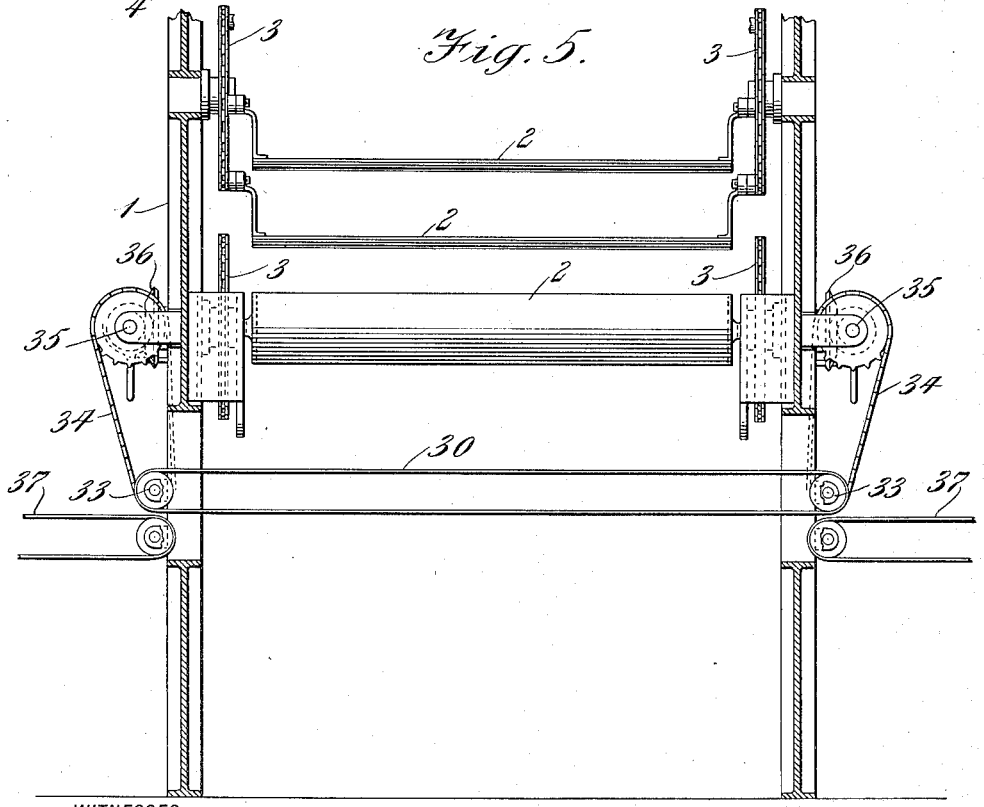
WITNESSES:
INVENTOR
BY
ATTORNEY

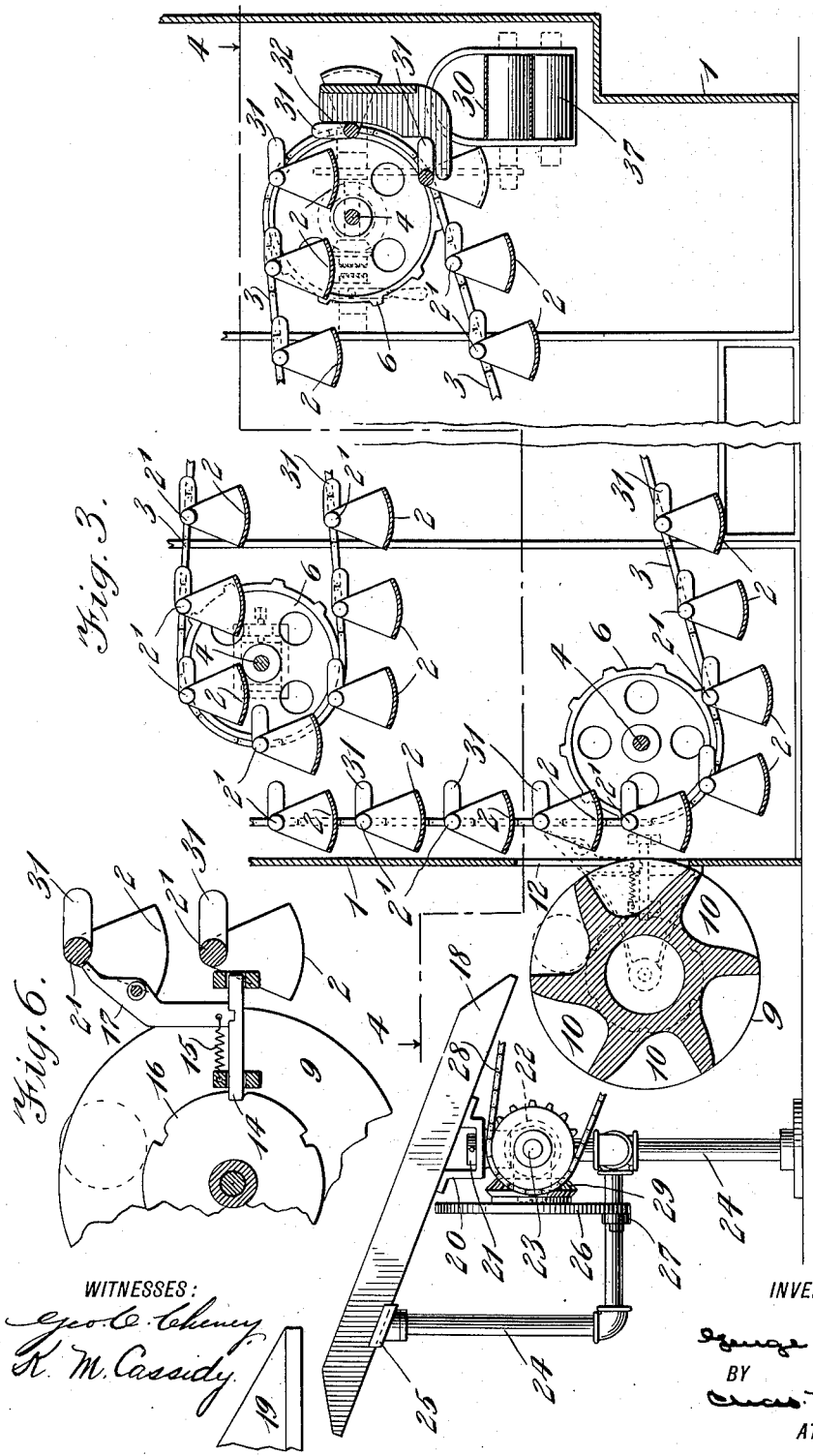

G. J. HICKS.
PROOFING MACHINE.
APPLICATION FILED NOV. 12, 1909.

1,025,914.

Patented May 7, 1912.

3 SHEETS—SHEET 3.

WITNESSES:

INVENTOR

BY

ATTORNEY

UNITED STATES PATENT OFFICE.

GEORGE J. HICKS, OF SAGINAW, MICHIGAN, ASSIGNOR TO RICHARD & OTTO WERNER, OF CANNSTATT, GERMANY.

PROOFING-MACHINE.

1,025,914.  Specification of Letters Patent. Patented May 7, 1912.

Application filed November 12, 1909. Serial No. 527,609.

*To all whom it may concern:*

Be it known that I, GEORGE J. HICKS, a citizen of the United States, and resident of Saginaw, in the county of Saginaw and State of Michigan, have invented certain new and useful Improvements in Proofing-Machines, of which the following is a specification.

My invention has particular reference to dough proofing machines, although it is also applicable to other machines of the same general type adapted for proofing and drying purposes.

In the making of bread by the use of machinery, the bread dough is usually first kneaded and then allowed to stand or proof a certain period of time to permit of the proper action of the yeast. Subsequently it is run through a "divider" machine to be cut or separated into loaves of a desired size. The action of the machine in cutting or separating the dough operates to open the yeast cells at the line of division of the dough. For such reason the now divided loaves are next run through a "rounding-up" machine which operates to close up the opened yeast cells. In thus operating on the dough to divide the same into loaves and subsequently rounding up the latter, the action of the yeast has been so retarded that it becomes necessary that the dough should be further proofed. For such purpose the loaves are therefore fed from said "rounding-up" machine to a machine adapted for permitting such further proofing of the dough, to which latter type of machine my present invention more particularly relates.

The object of my invention is to provide an improved machine of the type referred to that will be simple in construction and effective in operation, and that will be wholly automatic in its operation, including its automatic feed and its automatic discharge.

To this end the invention consists in the new and novel features of construction and combinations of parts as hereinafter described and particularly pointed out in the appended claims.

Referring now to the accompanying drawings forming part of this specification,—Figures 1 and 2 are side and end elevations respectively of a proofing machine embodying my invention. Figs. 3, 4, and 5 are enlarged side, plan and end views respectively, of the machine, partly broken away and partly in section. Fig. 6 is an enlarged fragmentary detail of the feed latch mechanism.

Similar reference characters in the several figures of the drawings indicate like parts.

A machine embodying my invention will preferably embody as its main features, a tray mechanism for receiving charges of dough and moving them about within a closed chamber such a length of time as will permit of their being properly proofed, a feed device for receiving the charges of dough and automatically feeding them to said tray mechanism, and means for automatically discharging the charges of dough from said tray mechanism after they have been properly proofed.

The proofing chamber within which the charges of dough are moved by the tray mechanism is formed by a casing, indicated generally by 1, which in the present instance forms the main supporting frame for the several operative parts of the machine. The tray mechanism, located within the said proofing chamber, preferably embodies a series of elongated trays 2, a carrier for said trays in the form of two endless sprocket chains 3, 3, to which the trays are connected at their opposite ends for pivotal suspension therebetween, and a series of shafts 4 mounted at their ends in journal-boxes 5 on the side walls of the casing 1 and carrying sprocket wheels 6 over which the said chains are guided to move the trays in a path back and forth through the proofing chamber; the distance of travel of the trays being such as to provide a sufficient length of time to assure the proper proofing of the supported material. A movement is imparted to the trays and their carrier chains from a main driving shaft 7 through a train of gearing, indicated generally by 8, connecting with one of the sprocket-wheel shafts 4 as shown. The charges of dough or other material to be proofed or dried may be fed to this tray mechanism by any suitable means, but as before stated I prefer to provide means for automatically feeding the same, and this means in the present case embodies a rotary feed device and means actuated by the tray mechanism for automatically controlling the action of said feed device. The feed device, indicated generally by 9, is shown in the form of a cylindrical element having a plurality of elongated charge-receiving pockets 10 arranged about its periphery, and is located in position outside or adjacent to the casing 1 whereby it may discharge directly to the trays through an opening 12 in the casing; the feed device being supported in such position by bracket arms 13, 13, projecting from the casing in which it is journaled at its ends as shown. This feed device is normally held in stationary position with one of said pockets in charge-receiving position relative to a chute or other source of supply, which said charge-receiving position of the pocket is at one side of the vertical center of the feed device whereby, upon the release of the feed device by its holding means, it will be caused to rotate under the weight of the received charges to a position to discharge the latter onto the trays 2. Upon the movement of the feed device to bring the charge holding pocket to such discharge position, and which movement will bring the succeeding pocket to charge-receiving position, it will be automatically stopped. Such stopping of the feed device and subsequent releasing of the same may be accomplished by any suitable means, the means shown in the present case comprising a slidable latch 14 supported on the casing 1 with one end yieldingly held by a spring 15 in engagement with a notched disk 16 on the feed device to hold the latter stationary, and a lever 17 also supported on the casing 1 with one end in connection with said latch and its other end projecting into the path of movement of the tray arms 2' to be operated thereby to withdraw the latch from locking engagement with the disk 16 and release the feed device.

The charges of dough or other material may be delivered to the feed device in any desired or suitable manner. They will, however, usually be delivered from a chute 18 arranged to receive them from the table 19 of a "rounding up" machine, and as the charges will preferably be received in the chute from the table 19 at one point thereof, and be subsequently delivered from the chute to the elongated pocket of the feed device at successive points ranging from one end of the pocket to the other, the chute in the present case is supported and operated in a manner to permit of such receiving and discharging of the charges. The chute 18, which is supported in an inclined position with its upper end beneath the table 19 and its lower end adjacent to the feed device at the upper side thereof, is pivotally connected at its under side, by means of a perforated plate 20 attached thereto, with the headed stem 21 of a sleeve 22 slidably mounted on a rod 23 carried by a frame 24, which said sleeve is operated to have a reciprocatory movement on the rod 23 and move the lower or delivery end of the chute in a lateral direction from one end to the other of the pockets of the feed device for delivering the charges thereto. The upper or receiving end of the chute loosely rests on a pivoted plate 25 at the upper end of the frame 24 by which it is confined in position to receive the charges from the table 19 at one point thereof. The reciprocatory sleeve 22 may be operated by any suitable means to impart the described lateral movement to the chute, the means shown in the present case comprising a rotating crank 26 mounted on the frame 24 and having a driving connection with said sleeve 22 through a pitman 27, the said crank in turn being driven from the main driving shaft 7 through suitable operative connections including the gearing 8, the belt or chain connection 28, and the beveled gears 29, 29, as most clearly shown in Figs. 1 and 4.

After the charges of dough or other material have been properly proofed or dried, they are adapted to be discharged from the trays onto a suitable conveyer, such as indicated at 30, by which they may be carried to some other machine or place to be further treated. Such discharging of the charges from the trays is preferably automatically effected, and the means employed in the present case for so doing comprises a crank-arm 31 on each tray, and a stationary cam 32 supported by the casing at the rear or discharge end of the machine in position for engaging with said crank-arm 31 and operating the same to tilt the tray to discharge position at a point above the conveyer, as clearly shown in Fig. 3. This tray tilting means is duplicated at each end of the tray as clearly shown in Fig. 4. The conveyer 30 is shown in the form of an endless belt extending transversely through the proofing chamber and being mounted at its opposite ends on drums 33, 33, journaled in suitable bearings at the exterior side of the chamber, which said drums each have a chain-and-sprocket connection 34 with a shaft 35 also journaled in bearings at the exterior side of the chamber and having operative connection with a driver, here shown as one of the shafts 4, through suitable gearing 36—36. From the conveyer 30 the charges may in turn be delivered to other conveyers, such as indicated at 37.

The operation of the machine as described, in brief, is substantially as follows: The machine being set in motion and the charges of dough or other material being fed to the chute, the latter will be operated to move its lower delivery end in a direction from one end to the other of the adjacent pocket of the feed device and deliver thereto a row of charges, after which the latch 14 will be operated from the continuously moving tray mechanism to release the feed device and permit its being automatically moved or rotated under the weight of the charges a sufficient distance to discharge the charges onto the adjacent tray of the tray mechanism, at which time the feed device will be automatically stopped by the action of the slide 14 snapping into the succeeding notch of the disk 16. Thereafter the charges delivered to the tray will be carried by the latter in a path back and forth through the proofing chamber a sufficient length of time to assure their being properly proofed, when the tray will be automatically tilted by the coöperation of the cams 32 and tray arms 31 to discharge the proofed material onto the conveyer 30. Such feeding and discharging operation takes place in connection with each successive tray as will be understood.

What I claim is:—

1. In a machine of the character described and in combination, a tray mechanism comprising a tray and a carrier therefor, a rotary feed device for delivering charges to said tray, and means actuated by the tray mechanism for controlling the action of said feed device.

2. In a machine of the character described and in combination, a tray mechanism comprising a tray and a continuously moving carrier therefor, an intermittently movable rotary feed device for delivering charges to said tray, and means actuated by the tray mechanism for controlling the action of said feed device.

3. In a machine of the character described and in combination, a tray mechanism comprising a tray and a carrier therefor, a feed device for delivering charges to said tray having an elongated charge-receiving pocket, and means movable in a general direction lengthwise of said pocket for delivering a series of charges thereto.

4. In a machine of the character described and in combination, a tray mechanism comprising a tray and a carrier therefor, a rotary feed device for delivering charges to said tray having an elongated charge-receiving pocket, and means movable in a general direction lengthwise of said pocket for delivering a series of charges thereto.

5. In a machine of the character described and in combination, a tray mechanism comprising a tray and a carrier therefor, a rotary feed device for delivering charges to said tray having a plurality of elongated charge-receiving pockets arranged about its periphery, and means movable in a general direction lengthwise of said pocket for delivering a series of charges thereto.

6. In a machine of the character described and in combination, a tray mechanism comprising a tray and a carrier therefor, a rotary feed device for delivering charges to said tray having an elongated charge-receiving pocket, an inclined chute for delivering charges to said pocket of the feed device, and means for moving the delivery end of said chute in a general direction lengthwise of said pocket.

7. In a machine of the character described and in combination, a tray mechanism comprising a tray and a carrier therefor, a rotary feed device for delivering charges to said tray having an elongated charge-receiving pocket, a pivoted inclined chute for delivering charges to said pocket of the feed device, and means for moving the delivery end of said chute in a general direction lengthwise of said pocket.

8. In a machine of the character described and in combination, a tray mechanism comprising a tray and a carrier therefor, an intermittently movable feed device for delivering charges to said tray having an elongated charge-receiving pocket, and means movable in a general direction lengthwise of said pocket for delivering a series of charges thereto.

9. In a machine of the character described and in combination, a tray mechanism comprising a series of trays and a continuously moving carrier therefor, an intermittently movable rotary feed device for delivering charges to said tray having a plurality of elongated charge receiving pockets arranged about its periphery, an inclined chute for delivering charges to said pockets of the feed device, and means for moving the delivery end of said chute in a general direction lengthwise of said pockets of the feed device.

10. In a machine of the character described and in combination, a tray mechanism comprising a tray and a carrier therefor, a rotary feed device for delivering charges to said tray, means holding said feed device in position to receive a charge at one side of its vertical center, and means for releasing the feed device and permitting its movement to delivery position under the weight of its charge.

11. In a machine of the character described and in combination, a tray mechanism comprising a tray and a carrier therefor, a rotary feed device for delivering charges to said tray, means holding said feed device in position to receive a charge at one side of its vertical center, and means for automatically releasing the feed device at predetermined times and permitting its movement to delivery position under the weight of its charge.

12. In a machine of the character described and in combination, a tray mechanism comprising a tray and a carrier therefor, a rotary feed device for delivering charges to said tray, means holding said feed device in position to receive a charge at one side of its vertical center, and means operated by the tray mechanism for releasing the feed device and permitting its movement to delivery position under the weight of its charge.

13. In a machine of the character described and in combination, a tray mechanism comprising a tray and a carrier therefor, a rotary feed device for delivering charges to said tray having a plurality of charge receiving pockets arranged about its periphery, a chute for delivering charges to said feed device, means normally holding said feed device in position with one of its said pockets thereof in charge-receiving position relative to the chute at one side of the vertical center of the feed device, and means operated by the tray mechanism for releasing the feed device and permitting its movement to delivery position under the weight of its charge.

14. In a machine of the character described and in combination, a proofing chamber, a tray mechanism comprising a tray and a carrier therefor located and operative within said chamber, a rotary feed device for delivering charges to said tray, means actuated by the tray mechanism for controlling the action of said feed device, and means for automatically tilting said tray to discharge position at certain predetermined times.

15. In a machine of the character described and in combination, a tray mechanism comprising a swinging tray and a carrier therefor, and means, including a stationary cam and an arm on the tray for sliding engagement with said cam, for automatically tilting said tray bodily to discharge position.

16. In a machine of the character described and in combination, a tray mechanism comprising a series of swinging trays and a continuously moving carrier therefor, an endless belt conveyer at the discharge end of the machine, and means, including stationary cams and arms on the trays for sliding engagement with said cams, for automatically tilting said trays bodily at predetermined times to discharge their charges onto said conveyer.

Signed at Saginaw in the county of Saginaw and State of Michigan this 29th day of Oct. A. D. 1909.

GEORGE J. HICKS.

Witnesses:
ELLA ZIEGLER,
EVA C. RICHARD.